(12) United States Patent
Kiyono (10) Patent No.: US 8,144,412 B2
(45) Date of Patent: Mar. 27, 2012

(54) MAGNETIC DISK DEVICE HAVING MECHANISM FOR DETECTING PROJECTIONS ON RECORDING MEDIUM

(75) Inventor: Hiroshi Kiyono, Tokyo (JP)

(73) Assignee: TDK Corporation, Tokyo (JP)

( * ) Notice: Subject to any disclaimer, the term of this patent is extended or adjusted under 35 U.S.C. 154(b) by 112 days.

(21) Appl. No.: 12/591,562

(22) Filed: Nov. 24, 2009

(65) Prior Publication Data
US 2011/0122533 A1    May 26, 2011

(51) Int. Cl.
*G11B 5/02* (2006.01)
*G11B 27/36* (2006.01)
*G11B 5/127* (2006.01)
*G11B 5/60* (2006.01)
*G11B 15/64* (2006.01)
*G11B 17/32* (2006.01)
*G11B 21/20* (2006.01)

(52) U.S. Cl. .......... 360/25; 360/31; 360/110; 360/234.4
(58) Field of Classification Search .................. None
See application file for complete search history.

(56) References Cited

U.S. PATENT DOCUMENTS

| | | | | |
|---|---|---|---|---|
| 5,764,432 A * | 6/1998 | Kasahara | ................ | 360/75 |
| 7,068,457 B2 * | 6/2006 | Riddering et al. | ............. | 360/75 |
| 2007/0070550 A1 * | 3/2007 | Kurita et al. | ................ | 360/234.7 |
| 2007/0177302 A1 * | 8/2007 | Shimazawa et al. | .......... | 360/126 |
| 2007/0217053 A1 | 9/2007 | Sugimoto | | |
| 2007/0253090 A1 * | 11/2007 | Hirano et al. | .................. | 360/75 |
| 2008/0007871 A1 | 1/2008 | Kiyono et al. | | |
| 2010/0073799 A1 * | 3/2010 | Ionescu | .......................... | 360/46 |
| 2010/0073823 A1 * | 3/2010 | Aoki et al. | ................ | 360/291.9 |
| 2010/0142096 A1 * | 6/2010 | Contreras et al. | .......... | 360/245.8 |

FOREIGN PATENT DOCUMENTS

| | | | |
|---|---|---|---|
| EP | 0 651 375 | | 10/1994 |
| JP | 03065602 A | * | 3/1991 |
| JP | A-H06-243434 | | 9/1994 |
| JP | A-H07-169005 | | 7/1995 |
| JP | A-H09-259401 | | 10/1997 |

* cited by examiner

*Primary Examiner* — Daniell L Negron
*Assistant Examiner* — Regina N Holder
(74) *Attorney, Agent, or Firm* — Posz Law Group, PLC (57) ABSTRACT

A thin film magnetic head includes a medium projection detection mechanism that detects a projection on the surface of a recording medium. The medium projection detection mechanism has a discharging electrode, a capacitor, and an input line and an output line that are connected to the discharging electrode. The discharging electrode is configured to receive a voltage applied through the input line, and the capacitor is configured to store electric charge by the applied voltage. The output line is connected to a projection detection processing system and is connected to the charging electrode and the projection detection processing system to detect the location of the projection that is a detection target by detecting voltage change that is caused by discharging between the discharging electrode and the projection when the projection is detected.

11 Claims, 7 Drawing Sheets

MAGNETIC DISK DEVICE HAVING MECHANISM FOR DETECTING PROJECTIONS ON RECORDING MEDIUM

BACKGROUND OF THE INVENTION

1. Field of the Invention

The present invention relates to a thin film magnetic head that has a medium projection detection mechanism for detecting projections on a surface of a recording medium by discharging, and a head gimbal assembly and a magnetic disk device that include the thin film magnetic head.

2. Description of Related Art

In a magnetic disk device, a magnetic head is floated by an airflow that is created by rotation of a magnetic disk (or a recording medium) so that information is recorded on and reproduced from the magnetic disk. A flying height of the magnetic head (hereinafter flying height) is decreased with an increase in the high recording density of the magnetic disk. In recent years, the flying height has become smaller and smaller in size to approximately 10 nm or less. However, when the flying height is less than 10 nm, the magnetic head has a tendency to hit a projection on the magnetic disk surface. Therefore, there is a possibility that characteristics of the magnetic head may be changed due to the change in shape of the magnetic head caused by frictional heat and contact.

Because of the problem discussed above, in a recording medium magnetic disk, surface projections are miniaturized with a high precision surface treatment (burnish) so that, recently, a required projection height (ground height) may be less than 4 nm.

In order to float a head slider with a certain flying height, it is necessary that a flying force (lifting power) generated at an air bearing surface (ABS) of the head slider, a gravitational force of the head slider, and a total spring load (pressing load) force of a suspension attached to one end of the head slider are balanced out. Also, it is necessary that each of these forces or loads has a specified value.

When a reading element frequently hits a projection existing on a recording medium surface (medium projection), the element property deteriorates (property deterioration occurs). As a method to resolve this problem, there is the following method in which a track where the projection exists is not used. When the reading element hits the projection, a mapping in which the location of the projection exists on the recording medium surface is specified is performed by measuring a resistance change due to the element's temperature change. However, when the reading element is a so called tunneling magnetoresistive (TMR) element, there is a disadvantage in that accurate mapping is difficult. Because an oxide layer, such as $Al_2O_3$, MgO, $TiO_X$, or the like, is used as a barrier film to be sandwiched by two ferromagnetic layers and has a small temperature dependence with respect to the resistance so that the resistance change is small, it is hard to detect when the reading element hits the projection. Since the temperature coefficient of resistance of a TMR element in which MgO or the like is used for the barrier film is close to zero, the resistance change that is caused by a temperature increase due to the hitting is minimal so that it is hard to detect the hitting of the projection.

For a giant magnetoresistive (GMR) element in which an intermediate layer made of a metal layer, such as Cu, is sandwiched by two ferromagnetic layers, an operation based on the method of making the mapping through the hitting between the element and projection cannot be said as the best method. Because a direction of a longitudinal bias that is applied in the track width direction with a hard magnet by plural hitting is changed, there is a possibility that the property degradation occurs.

In consideration of the situation described above, the present invention is provided. An object of the present invention is to provide a novel thin film magnetic head to detect a projection on a recording medium surface in a noncontacting manner and further enabling the mapping instead of the conventional mapping for the projection on the recording medium surface with contact. It is also an object to provide a head gimbal assembly and a magnetic disk device system that have the thin film magnetic head mentioned above.

SUMMARY OF THE INVENTION

In order to solve the above drawbacks, the present invention relates to a thin film magnetic head having a slider substrate and a reproducing element. The thin film magnetic head includes a medium projection detection mechanism that detects a projection on a surface of a recording medium located opposed to an air bearing surface (ABS) of the thin film magnetic head. The medium projection detection mechanism has a discharging electrode in which a discharging edge is exposed in the vicinity of the reproducing element on the ABS, a capacitor that stores an electric charge by connecting to the discharging electrode, and an input line and an output line that are connected to the discharging electrode. The discharging electrode is configured to receive a voltage applied through the input line by a voltage application device that is connected from the outside, and the capacitor is configured to store electric charge by the applied voltage. The output line is connected to a projection detection processing system, the output line being connected to the charging electrode and the projection detection processing system to detect the location of the projection that is a detection target on the surface of the recording medium by detecting voltage change that is caused by discharging between the discharging electrode and the projection that is the detection target existing on the surface of the recording medium when the projection is detected.

In a preferred embodiment of the thin film magnetic head of the present invention, a resistance is inserted between the voltage application device that is connected to the outside and the discharging electrode in order to obtain a signal of the voltage change.

In a preferred embodiment of the thin film magnetic head of the present invention, the resistance is inserted in the input line.

In a preferred embodiment of the thin film magnetic head of the present invention, one end of the capacitor is connected to the discharging electrode and another end of the capacitor is grounded through the slider substrate.

In a preferred embodiment of the thin film magnetic head of the present invention, a length in a track width direction (X direction) of a discharging edge that is exposed on the ABS of the discharging electrode is 0.1-25 μm, and a length in a height direction (Z direction) of the discharging edge is 0.1-5 μm.

In a preferred embodiment of the thin film magnetic head of the present invention, electrical capacitance of the capacitor is 0.01-1 pF.

In a preferred embodiment of the thin film magnetic head of the present invention, voltage applied by the voltage application device is 0.01-1.0 V.

In a preferred embodiment of the thin film magnetic head of the present invention, the thin film magnetic head further includes an insulating layer that is formed on the slider substrate, a first shield layer and a discharging electrode that are formed on the insulating layer, the discharging electrode and the first shield layer made of the same material. Parasitic capacitance of the insulating layer that is sandwiched between the discharging electrode and the slider substrate is used as capacitor capacitance.

A head gimbal assembly of the present invention includes the thin film magnetic head described above, and a suspension elastically supporting the slider substrate.

A magnetic disk device of the present invention includes the above mentioned thin film magnetic head, a voltage application device connecting to a discharging electrode through the input line, and a projection detection processing system in which, when a projection that is a detection target existing on the surface of the recording medium is detected through the output line, the projection detection processing system detects the location of the projection that is a detection target on the surface of the recording medium by detecting voltage change that is caused by discharging between the discharging electrode and the projection that is the detection target.

In a preferred embodiment of the magnetic disk device of the present invention, the projection detection processing system further includes an amplifier that amplifies the voltage change of the discharging electrode at a time when the discharging occurs, and a comparator that is configured to generate a digital pulse in correspondence with a threshold that is previously set.

BRIEF DESCRIPTION OF THE DRAWINGS

FIG. 2 is a view of the thin film magnetic head shown in FIG. 1 seen from an opposing medium surface (or air bearing surface, hereinafter collectively ABS). Particularly, FIG. 2 is a view of a reproducing head as a main part having a reproducing element.

DETAILED DESCRIPTION OF THE PREFERRED EMBODIMENTS

The best mode for implementing the present invention will be described in detail hereafter.

Figure 1:
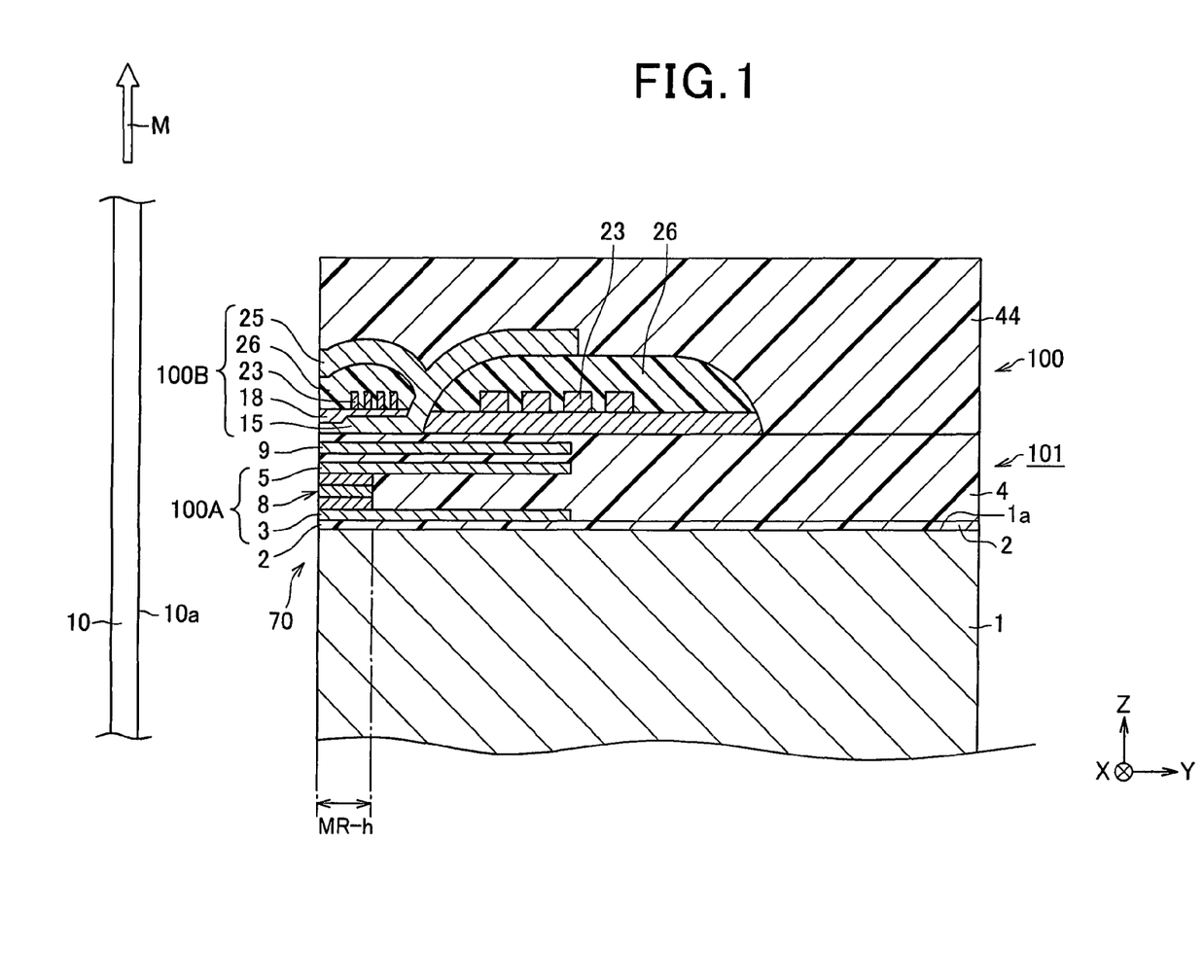
FIG. 1 is a sectional view taken along the Y-Z plane that is a longitudinal sectional view with respect to an ABS to show a structure of a thin film magnetic head according to the present invention.
Figure 2:
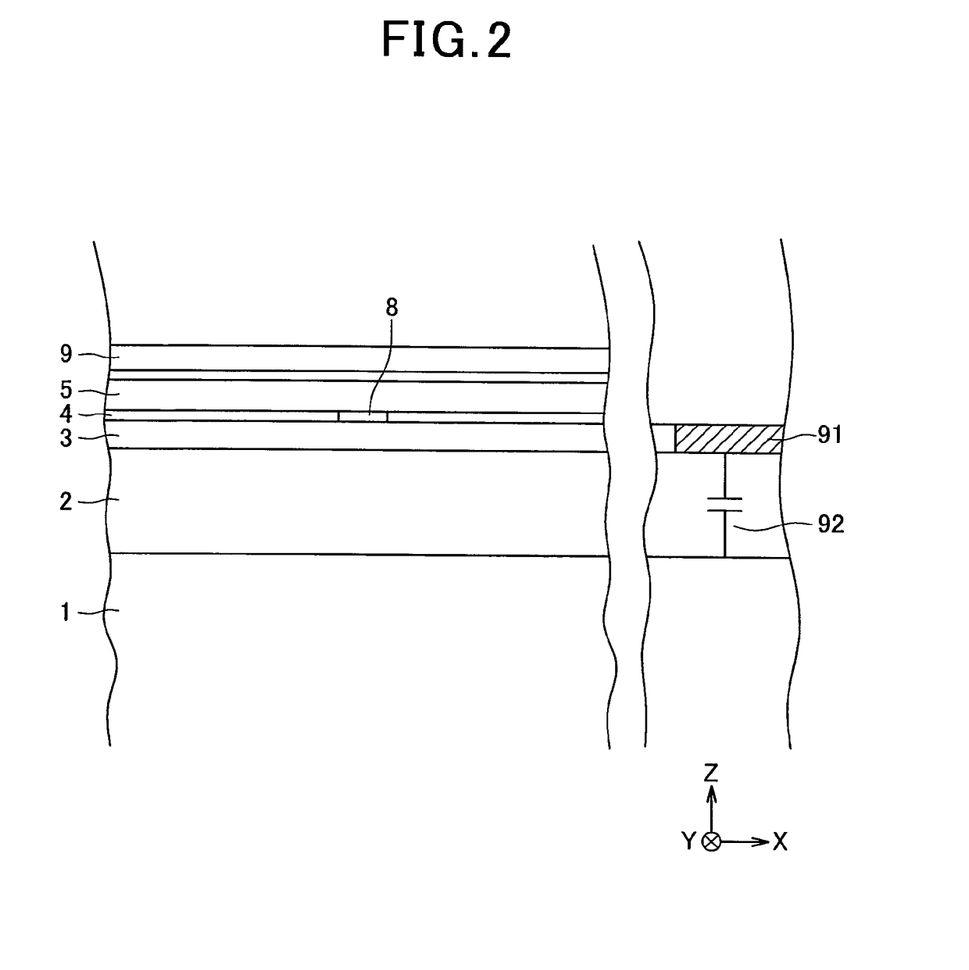
Figure 3:
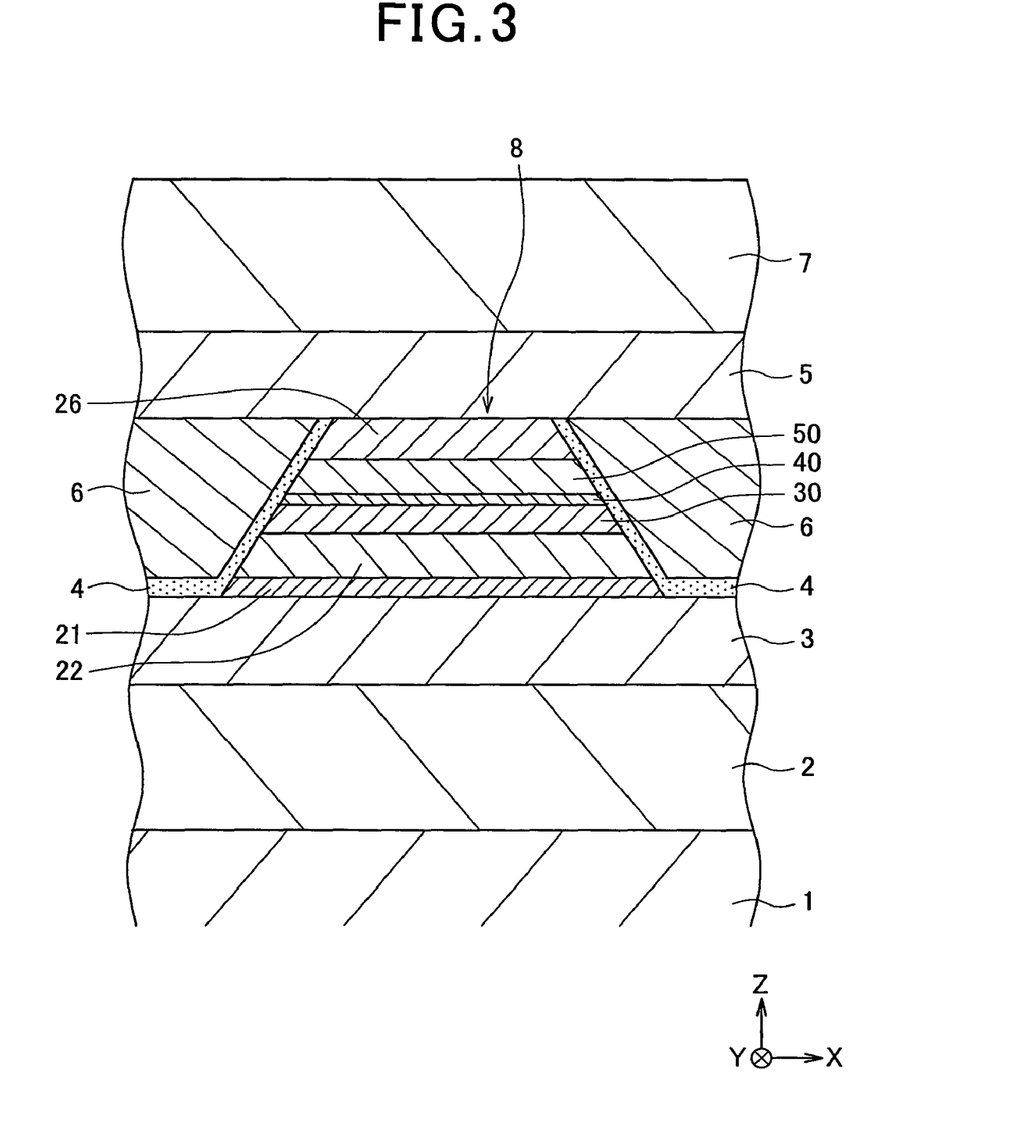
FIG. 3 is a partial enlarged view seen from an ABS for explaining a reproducing element.

FIG. 1 is a sectional view taken along the Y-Z plane that is a longitudinal sectional view with respect to an ABS (a surface of a thin film magnetic head opposed to a recording medium) to show a structure of a thin film magnetic head according to the present invention. FIG. 2 is a view of a thin film magnetic head shown in FIG. 1 seen from the ABS. Particularly, FIG. 2 is a view of a reproducing head as a main part having a reproducing element. FIG. 3 is a partial enlarged view seen from an ABS for explaining a reproducing element.

In the explanation below, the X axis is defined as "width," the Y axis is defined as "length," and the Z axis is defined as "thickness" in the drawings. In the Y axis direction, an area that is close to an ABS is defined as "front," and an area that is opposite to the front is defined as "rear (or posterior)." The laminated up direction of an element is defined as "above" or "upper side," and the opposite direction is defined as "below" or "lower side."

A thin film magnetic head 100 shown in FIG. 1 is used as an assembly in a magnetic recording device (magnetic disk device), such as a hard disk drive in order to perform magnetic processing to a recording medium 10, such as a hard disk, that moves in the medium traveling direction M.

The thin film magnetic head 100 as exemplified in the drawing is a so-called complex type head that is executable for both recording processing and reproducing processing as magnetic processing. As shown in FIG. 1, it has a structure of a magnetic head part 101 formed on a slider substrate 1 structured of ceramic material such as ALTIC ($Al_2O_3 \cdot TiC$).

The slider substrate 1 is, as a schematic configuration, configured to have a geometric structure for controlling the flying characteristic at an ABS. As the geometric structure, various patterns, configurations, and structures have been proposed. In the present invention, any of these geometric structures can be selected.

The slider substrate 1 made of ALTIC or the like is excellent in wear resistance and lubricity. However, such a substrate has high electrical conductivity. Therefore, an insulating layer 2 made of an inorganic insulating material, such as $Al_2O_3$ and $SiO_2$, is adhered on a plane of the slider substrate 1 in which an element is formed.

A magnetic head part 101 has a lamination structure of a reproducing head part 100A for reproducing magnetic information recorded using the magnetoresistive effect (MR effect) and, for example, a shield type recording head part 100B for executing the recording processing of the perpendicular recording system.

A description is given below in more detail.

A first shield layer 3 and a second shield layer 5 are flat layers formed in a manner of being substantially parallel to the side surface 1a of the slider substrate 1. The layers 3 and 5 form a part of the ABS 70.

An MR element (or reproducing element 8) is sandwiched between the first shield layer 3 and the second shield layer 5 and forms part of the ABS 70. A height perpendicular to the ABS 70 (i.e., in the Y direction) is an MR height (MR-h).

The first shield layer 3 and the second shield layer 5 are formed by a pattern plating method including a frame plating method, for example.

The reproducing element 8 is a lamination film substantially parallel to the side surface 1a of the slider substrate 1, and forms a part of the ABS 70.

The reproducing element 8 is preferably the lamination film in a film surface perpendicular type (or current perpendicular to plane: CPP) structure in which a sense current flows in the direction perpendicular to the laminating surface.

Moreover, as shown in FIG. 1, an interelement shield layer 9 made of the same material as that of the second shield layer 5 is formed between the second shield layer 5 and the recording head part 100B.

The interelement shield layer 9 shields the reproducing element 8 from a magnetic field generated by the recording head part 100B, thereby blocking exogenous noises at the time of reproduction. A bucking coil part may also be formed between the interelement shield layer 9 and the recording head part 100B. The bucking coil part generates magnetic flux that overrides a magnetic flux loop that is generated by the recording head part 100B and that passes through the upper and lower electrode layers of the reproducing element 8 and, therefore, suppresses unnecessary writing to a magnetic disk or wide area adjacent tracks erasing (WATE) phenomena that are erasing operations.

Insulating layers 2, 4, and 44 made of alumina and so on are formed in the following sections (note that as discussed above, the insulating layer is an insulating layer that is formed on a plane of the slider substrate 1 in which an element is formed):

i) in a gap between the first shield layer 3 and the second shield layer 5 on the side opposite to the ABS 70 of the reproducing element 8;

ii) in rear (posterior) regions of the first and second shield layers 3 and 5 and the interelement shield layer 9, the rear regions being opposite to the ABS 70;

iii) in a gap between the first shield layer 3 and the slider substrate 1; and iv) in a gap between the interelement shield layer 9 and the recording head part 100B.

Figure 4:
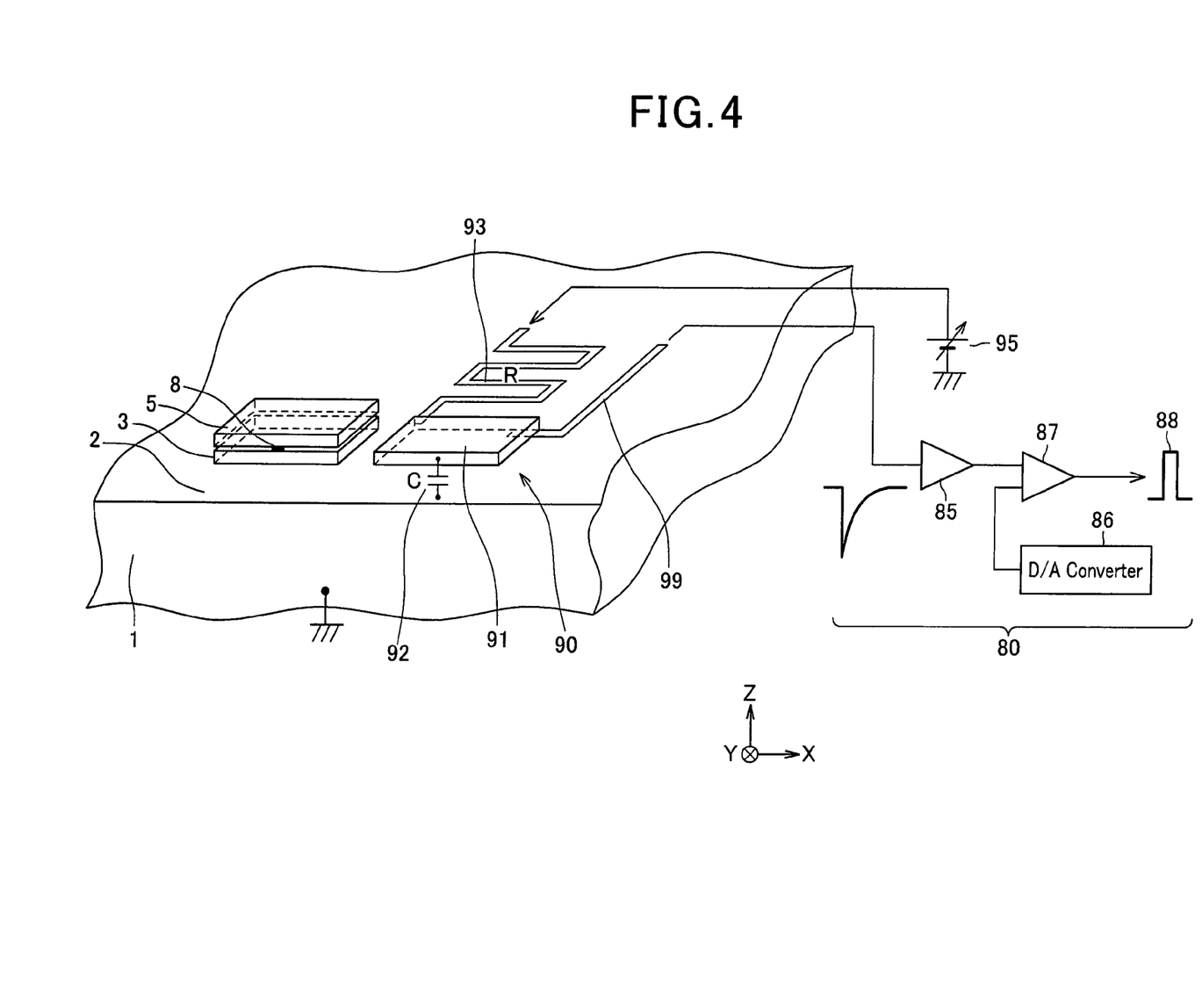
FIG. 4 is an illustration for explaining primary parts of a thin film magnetic head according to the present invention.

As shown in FIG. 2, the thin film magnetic head according to the present invention has a discharging electrode 91 at the ABS. The discharging electrode 91 is a part of a medium projection detection mechanism that detects a projection on a surface of a recording medium and is formed at the ABS in an exposed manner as shown in the drawing. In the present embodiment shown in FIG. 2, the discharging electrode 91 is configured with the same material as that of the first shield layer 3 and is formed in the vicinity of the first shield layer 3 at the same time of forming the first shield layer 3 (parallel arrangement is shown in FIG. 4). The medium projection detection mechanism including the discharging electrode 91 forms primary parts of the present invention and is explained later in detail.

The recording head part 100B is preferably structured for perpendicular magnetic recording and, as shown in FIG. 1, has a main magnetic pole layer 15, a gap layer 18, a coil insulating layer 26, a coil layer 23, and an auxiliary magnetic pole layer 25. The perpendicular recording system can be exchanged with a so-called longitudinal recording system.

The main magnetic pole layer 15 is structured to be a leading magnetic path for leading and focusing magnetic flux initiated by the coil layer 23 to the recording layer of a magnetic recording medium 10. It is preferred that the end part of the main magnetic pole layer 15 on the side of the ABS 70 should be smaller in thickness compared with other portions in the track width direction (i.e., the direction along the X-axis in FIG. 1) and in the laminating direction (i.e., the direction along the Z-axis in FIG. 1). As a result, it is possible to generate a minute and strong magnetic field for writing corresponding to high recording density.

A trailing shield part that has a wider layer cross section than the other portions of the auxiliary magnetic pole layer 25 is formed on the end part of the auxiliary magnetic pole layer 25 magnetically coupled with the main magnetic pole layer 15 on the side of the ABS 70. As shown in FIG. 1, the auxiliary magnetic pole layer 25 is opposed to the end part of the main magnetic pole layer 15 on the side of the ABS 70 via the gap layer 18 made of insulating material such as alumina and the coil insulating layer 26.

The provision of the auxiliary magnetic pole layer 25 enables formation of a steep magnetic field gradient between the auxiliary magnetic pole layer 25 and the main magnetic pole layer 15 in the vicinity of the ABS 70. As a result, jitter is reduced in a signal output, thereby making the error ratio smaller at the time of reproducing.

The auxiliary magnetic pole layer 25 is formed, for example, to about 0.5-5 μm in thickness by a frame plating method, a sputtering method or the like. The material may be an alloy made of two or three elements selected from the group consisting of Ni, Fe, and Co, for example, or an alloy made of the element, as a main component, along with predetermined chemical elements.

The gap layer 18 is formed to separate the coil layer 23 from the main magnetic pole layer 15. The gap layer 18 may be configured with a layer that may be made of, for example, $Al_2O_3$, diamond-like carbon (DLC) or the like having a thickness of about 0.01-0.5 μm, and that may be formed, for example, by a sputtering method, a CVD method or the like.

[Explanation of Reproducing Element and its Peripheral Structure]

The reproducing element 8 according to the present invention and its peripheral structure are shown in FIG. 3.

As shown in FIG. 3, the structure includes the first shield layer 3 and the second shield layer 5 that are spaced apart and opposed to each other in a thickness direction. The reproducing element 8 is configured with an MR element, such as a GMR element or TMR element, interposed between the first shield layer 3 and the second shield layer 5, an insulating layer 4 adapted to cover two sides of the reproducing element 8 and a part of the upper surface of the first shield layer 3 along those sides, and two bias magnetic field application layers 6 adjacent to the two sides of the reproducing element 8 through the insulating layer 4.

In this embodiment, the first shield layer 3 and the second shield layer 5 function both as a magnetic shield and as a pair of electrodes. In other words, they not only shield magnetism but also enable a sense current to flow in a direction intersecting the plane of each of the layers forming the reproducing element 8 such as, for instance, in a direction perpendicular to the plane of each of the layers forming the reproducing element 8 (lamination direction). For this reason, the first shield layer 3 and the second shield layer 5 may be referred to as a "lower electrode layer 3" and an "upper electrode layer 5," respectively.

In addition to the first shield layer 3 and the second shield layer 5, another pair of electrodes may be provided above and below the reproducing element 8.

In a more enlarged view, the reproducing element 8 as shown in FIG. 3 has a nonmagnetic intermediate layer 40, and a first ferromagnetic layer 30 and a second ferromagnetic pinned layer 50, which are laminated to sandwich the nonmagnetic intermediate layer 40.

The first ferromagnetic layer 30 is formed before the second ferromagnetic layer 50 is formed and is a layer provided in a lower part of the structure. Angle of magnetization directions of the first ferromagnetic layer 30 and the second ferromagnetic layer 50 relatively change due to an externally applied magnetic field.

With respect to the first ferromagnetic layer 30 and the second ferromagnetic layer 50, they may have the following structure: (1) when either one of the magnetic layers is magnetically pinned, the angle of the magnetization directions relatively change due to an externally applied magnetic field, or (2) when the both magnetic layers are free layers, both angle of magnetization directions relatively change due to an externally applied magnetic field.

In the embodiment shown in FIG. 3, the first ferromagnetic layer 30 located in a lower part of the structure is magnetically pinned and acts as a magnetic pinned layer 30; and the second ferromagnetic layer 50 located in an upper part of the structure acts as a free layer 50. As a sense current flows in a lamination direction of the reproducing element 8, it causes the reproducing element 8 to become operative in the current perpendicular to plane (CPP) type structure.

In the embodiment shown in FIG. 3, a magnetization direction of the free layer 50 changes due to an externally applied magnetic field, i.e., a signal magnetic field from a recording medium; and a magnetization direction of the magnetic pinned layer 30 is pinned due to an influence from an antiferromagnetic layer 22. In FIG. 3, the magnetic pinned layer 30 is formed in a lower part relative to the free layer 50. Therefore, the antiferromagnetic layer 22 is formed in a lower part relative to the magnetic pinned layer 30. This structure, referred to as a bottom-type structure, is used as an embodiment.

A cap layer 26 is formed on the free layer 50.

An under layer 21 is formed below the antiferromagnetic layer 22.

A detailed explanation of each structure is given below.

(First Ferromagnetic Layer 30 and Second Ferromagnetic Layer 50)

As discussed above, a stack of the first ferromagnetic layer 30, the nonmagnetic intermediate layer 40, and the second ferromagnetic layer 50 forms a sensor area. A total thickness of the stack is approximately 10-40 nm.

An exemplary material forming the first ferromagnetic layer 30 and the second ferromagnetic layer 50 may be, for example, NiFe, CoFe, CoFeB, CoFeNi, $Co_2MnSi$, $Co_2MnGe$, and $FeO_X$ (oxide of Fe).

These layers are not limited to a single layer, but can also be a multi-layer stack as well.

Each layer thickness of the first ferromagnetic layer 30 and the second ferromagnetic layer 50 is approximately 0.5-8 nm.

(Nonmagnetic Intermediate Layer 40)

The nonmagnetic intermediate layer 40 causes an MR effect and is made of, for example, Cu, Au, Ag, Zn, Ga, $TiO_X$, ZnO, InO, SnO, GaN, indium tin oxide (ITO), $Al_2O_3$, and MgO. The nonmagnetic intermediate layer 40 can be configured with a lamination film with two or more films.

A layer thickness of the nonmagnetic intermediate layer 40 is approximately 0.5-5 nm.

(Explanation of Antiferromagnetic Layer 22)

As discussed above, because the antiferromagnetic layer 22 is exchange-coupled with the magnetic pinned layer 30, the antiferromagnetic layer 22 functions to pin a magnetization direction of the magnetic pinned layer 30.

The antiferromagnetic layer 22 is made of an antiferromagnetic material containing an element M' and Mn. Herein, the element M' is composed of at least one selected from a group, for example, consisting of Pt, Ru, Rh, Pd, Ni, Cu, Ir, Cr, and Fe. The Mn content is preferably 35-95% by atomic weight. The antiferromagnetic materials are categorized into two types:

(1) non-heat treatment type antiferromagnetic materials that exhibit antiferromagnetism without heat treatment and induce an exchange-coupled magnetic field between themselves and a ferromagnetic material; and (2) heat treatment type antiferromagnetic materials that exhibit antiferromagnetism with heat treatment. In the above type (1), heat treatment is usually performed to align an exchange-coupling direction. Either type (1) or (2) can be used in the present invention. Examples of non-heat treatment type antiferromagnetic materials include RuRhMn, FeMn, and IrMn. Examples of heat treatment type antiferromagnetic materials include PtMn, NiMn, and PtRhMn.

A layer thickness of the antiferromagnetic layer 22 is approximately 4-30 nm.

(Explanation of Under Layer, Cap Layer, and Bias Magnetic Field Application Layer)

For example, a stack of a Ta layer and NiCr layer, or a stack of a Ta layer and Ru layer, is used as the under layer 21. A layer thickness of the under layer 21 is approximately 2-6 nm.

For example, Ta or Ru is used as the cap layer 26. A layer thickness of the cap layer 26 is approximately 0.5-20 nm.

For example, a hard magnetic layer (hard magnet) or a stack of a ferromagnetic layer and antiferromagnetic layer is used as the bias magnetic field application layer 6. Specifically, CoPt or CoCrPt can be used as shown.

[Explanation of Primary Parts of Thin Film Magnetic Head According to Present Invention]

A drawing that is for explaining primary parts of a thin film magnetic head according to the present invention is shown in FIG. 4.

In FIG. 4, the insulating layer 2 is formed on the slider substrate 1. The first shield layer 3, the second shield layer 5, and the reproducing element 8 sandwiched between these layers 3 and 5 are formed on the insulating layer 2.

A medium projection detection mechanism 90 is also provided next to a magnetic reading sensor function part in which the reproducing element 8 is centrally located.

The medium projection detection mechanism 90 is for detecting projections (see FIG. 1) on the surface 10a of the recording medium 10 that is located opposed to the ABS of the thin film magnetic head.

The medium projection detection mechanism 90 is configured with the discharging electrode 91 in which a discharging edge is formed to be exposed to the ABS, a capacitor 92 that stores electrical charge through its connection to the discharging electrode 91, and an input line 93 and output line 99 that are connected to the discharging electrode 91.

A voltage is applied to the discharging electrode 91 by a voltage application device 95 that is connected from the outside through the input line 93. Then, the capacitor 92 stores electrical charge by the applied voltage.

Meanwhile, a projection detection processing system 80 can be connected to the output line 99 that is connected to the charging electrode 91. The projection detection processing system 80 can detect the location of a projection that is a detection target on the medium surface by detecting a voltage change that is caused by discharging between the discharging electrode and the projection that is the detection target at the time of detecting the existence of the projection that is the detection target existing on the surface of a recording medium.

With the structures discussed above, when the projection that is the detection target exists on the surface of the recording medium is detected with noncontact, discharging between the discharging electrode and the projection that is the detection target occurs so that a voltage change of the electrode occurs. The location of the projection that has a certain height above the medium can be specified.

In the present invention, it is preferred that a resistance R is inserted between the voltage application device 95 connected to the outside and the discharging electrode 91 to obtain a signal for the voltage change. In the embodiment shown in FIG. 4, the input line 93 itself is the resistance. It is not limited to this case. The resistance R can be inserted at a part of the input line 93. The resistance R is formed by a metal thin film pattern that is made of Ta, W or the like. The value of the resistance is approximately 1 kΩ-100 kΩ. When the resistance in the above range is not provided, there are disadvantages. Specifically, when the resistance is too small, the discharging electrode has a short lifespan due to an excessive discharge frequency. On the other hand, when the resistance is too large, it takes too much time to charge the discharging electrode.

The input line 93 and the output line 99 are formed as a thin film by using thin film forming technologies and pattern forming technologies.

In the embodiment according to the present invention, the discharging electrode 91 is formed on the insulating layer 2, which is formed on the slider substrate 1. In the present invention, there are no restrictions for the material, location, and so on of the discharging electrode 91. As shown in FIG. 4, it is specifically preferred that the discharging electrode 91 is made of the same material of the first shield layer 3, and that the discharging electrode 91 and the first shield layer 3 are formed on the insulating layer 2 at the same time. As a result, the discharging electrode 91 can be efficiently formed in a production process, and the insulating layer 2 can be effectively utilized as the desired capacitor member.

In other words, parasitic capacitance that is generated by the existence of the insulating layer 2 made of, for example, alumina and inserted between the discharging electrode 91 and the slider substrate 1 can be used as the capacitance of the capacitor. In this case, the capacitor capacitance C is determined by a material of the insulating layer 2 (for example, relative permittivity of alumina is $\epsilon_r$; and vacuum electric permittivity is $\epsilon_0$), a flat plate area S of the discharging electrode 91 opposed to the slider substrate 1, and a thickness d of the insulating layer 2 (distance d between the discharging electrode 91 and the slider substrate 1).

In other words, the capacitance C of the capacitor is determined the following formula:

$$C=\epsilon_0 \times \epsilon_r \times (S/d).$$

As understood from FIG. 4, one end of the capacitor 92 is connected to the discharging electrode 91, and another end of the capacitor 92 is grounded through the slider substrate 1.

It is preferred that the length in the track width direction (X direction) of the discharging edge that is exposed to the ABS of the discharging electrode 91 is 0.1-25 μm, and the length in the height direction (Z direction) of the discharging edge is approximately 0.1-5 μm. When an area defined by the X-Z plane in the discharging edge is too large, a disadvantage occurs in that it becomes difficult to specify the location of a projection on the medium surface. In contrast, when the area is too small, a disadvantage occurs in that the electrode has a shortened lifespan due to discharging related damage.

It is preferred that the electrical capacitance of the capacitor 92 is in the range of approximately 0.01-1 pF. When the electrical capacitance of the capacitor 92 is too large, a disadvantage occurs in that the electrode is damaged due to discharging much of electrical charge. In contrast, when it is too small, a disadvantage occurs in that it becomes difficult to detect the projection because voltage change of the electrode is small at the time of discharging.

In another preferred embodiment, a heater for heating a part of the ABS is provided. When a part of the ABS is heated by the heater, it is possible that the part of the ABS protrudes due to thermal expansion. This type of technology is disclosed in, for example, Japanese laid-open patent application publication number 2008-16158A.

(Explanation of Voltage Application Device 95 and Projection Detection Processing System 80)

A thin film magnetic head according to the present invention can be connected to the voltage application device 95 and the projection detection processing system 80 from the outside. Since the device and system are connected, a magnetic disk device is formed.

As shown in FIG. 4, in the voltage application device 95 that is connected through the input line 93 from the outside, the applied voltage can be changed and adjusted. An actual applied voltage can be adjusted according to a projection height (ground height) of a medium that is detected.

When the voltage value is set high, a discharge even to a relatively low projection is possible (distance between the discharging electrode 91 and the projection is long). Accordingly, even such a low projection can be detected. In contrast, when the voltage value is set low, a discharge occurs only to a relatively high projection is possible (distance between the discharging electrode 91 and the projection is small). Accordingly, such a high projection can be detected. In the present invention, the applied voltage is generally about 0.01-1.0 V.

As shown in FIG. 4, the projection detection processing system 80 that is connected from the outside through the output line 99 is configured with an amplifier 85 that amplifies voltage change of the discharging electrode at the time when discharging occurs and a comparator 87 that confirms a level of the amplified signal. As shown in FIG. 4, a D/A converter 86 that sets a threshold value for converting to a digital pulse is also provided at the comparator 87.

With the structures discussed above, the threshold value (digital) is set at the D/A converter 86 by a CPU. The D/A converter 86 converts the digital threshold value information to an analog threshold voltage and supplies the threshold voltage to the comparator 87. The comparator 87 compares the amplified voltage change of the discharging electrode with the threshold voltage. In the drawing, when the voltage is below the threshold value, the comparator 87 converts the signal to a digital pulse 88 by setting this situation as a digital "1" state.

(Explanation of Head Gimbal Assembly and Magnetic Disk Device)

Next, a head gimbal assembly on which the above mentioned thin film head is mounted and one embodiment of a magnetic disk device is described below.

First, a slider 210 equipped with the head gimbal assembly is explained with reference to FIG. 5. In the magnetic disk device, the slider 210 is opposed to a hard disk that is a rotatably driven disk-like recording medium. The slider 210 is provided with a base substrate 211 primarily configured of a substrate and an overcoat.

The base substrate 211 is substantially hexahedronal. Of the six surfaces of the base substrate 211, one surface is opposed to the hard disk. The ABS 70 is formed on this surface.

Figure 5:
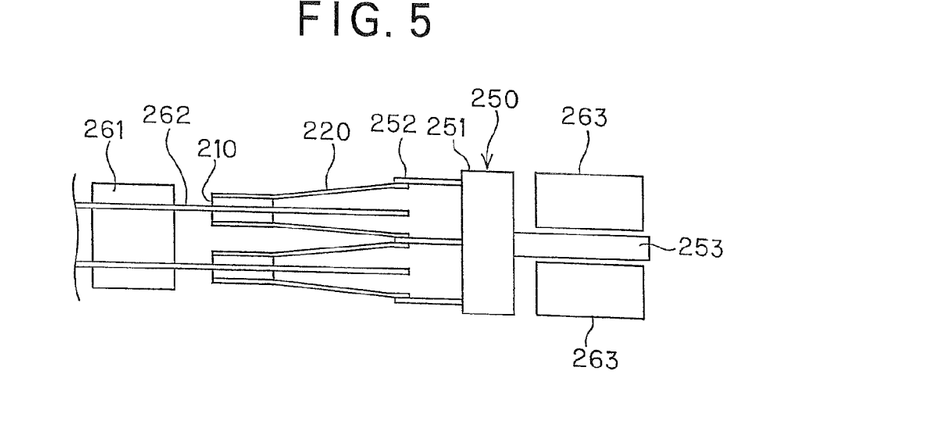
FIG. 5 is a perspective view of a slider that is a part of a head gimbal assembly according to one embodiment of the present invention.

When the hard disk is rotated in the Z direction in FIG. 5, an airflow passing between the hard disk and the slider 210 creates a downward lifting power in the Y direction in FIG. 5. The slider 210 floats from the surface of the hard disk by this lifting power. The X direction in FIG. 5 is the track traversing direction of the hard disk.

In the vicinity of the end part of the slider 210 on the air exit side (i.e., the end part on the lower left in FIG. 5), the thin film magnetic head according to the present embodiment is formed.

Figure 6:
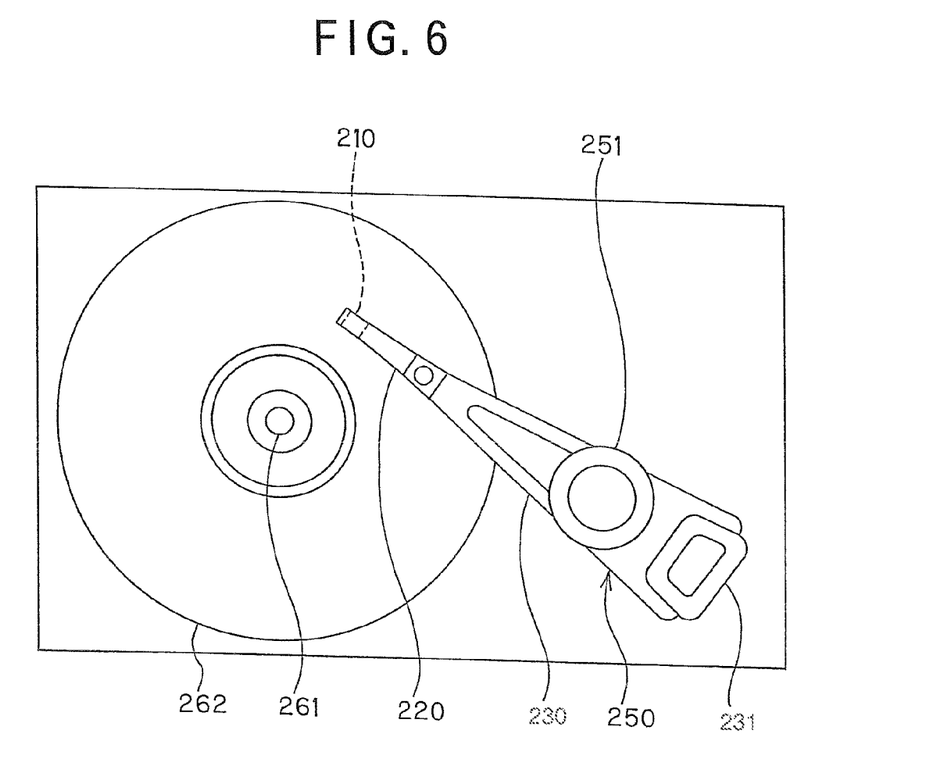
FIG. 6 is a perspective view of a head arm assembly that contains a head gimbal assembly according to one embodiment of the present invention.

Next, a description of the head gimbal assembly 220 according to the present embodiment is described by referring to FIG. 6. The head gimbal assembly 220 is provided with the slider 210 and a suspension 221 for elastically supporting the slider 210. The suspension 221 has a plate spring load beam 222 formed of stainless steel, a flexure 223 that is provided on one end part of the load beam 222 and joined with the slider 210 in a manner of giving the slider 210a proper degree of freedom, and a base plate 224 provided on the other end part of the load beam 222.

The base plate 224 is mounted on an arm 230 of an actuator for moving the slider 210 in the track traversing direction X of the hard disk 262. The actuator has the arm 230 and a voice coil motor for driving the arm 230. A gimbal part is provided for keeping a posture of the slider 210 constant on the portion of the flexure 223 on which the slider 210 is mounted.

The head gimbal assembly 220 is mounted on the arm 230 of the actuator. One arm 230 with a head gimbal assembly 220 mounted thereon is called a head arm assembly. A carriage having multiple arms, each of which has a head gimbal assembly mounted thereon, is referred to as a head stack assembly.

FIG. 6 shows one embodiment of a head arm assembly. In this head arm assembly, a head gimbal assembly 220 is mounted on one end part of the arm 230. A coil 231, part of a voice coil motor, is mounted on the other end part of the arm 230. A bearing part 233 is provided in the middle part of the arm 230 so that a shaft 234 is rotatably supported.

Figure 7:
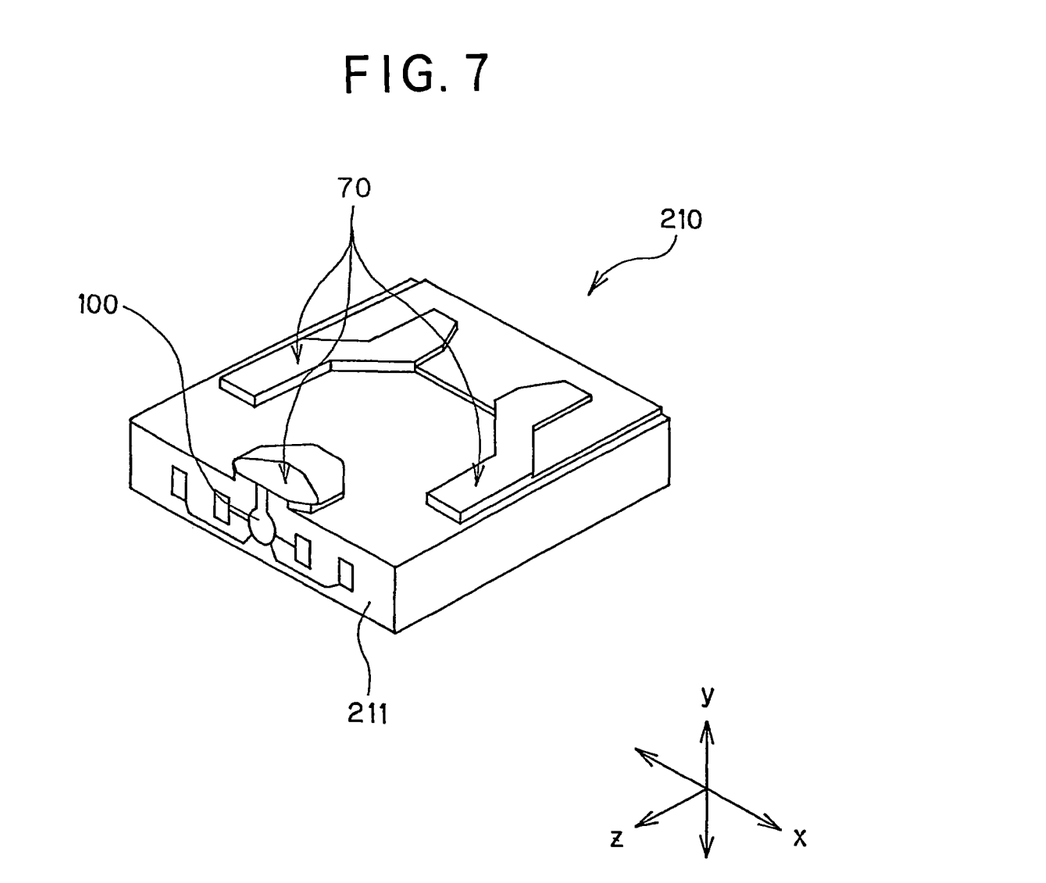
FIG. 7 is an illustration for explaining primary parts of a magnetic disk device according to one embodiment of the present invention.
Figure 8:
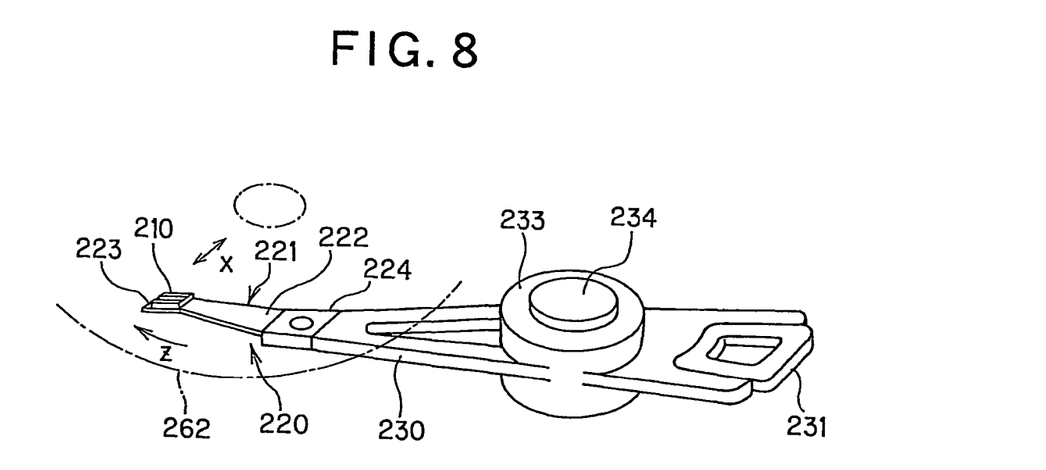
FIG. 8 is a top plan view of a magnetic disk device according to one embodiment of the present invention.

A description of one example of the head stack assembly and the magnetic disk device according to the present embodiment is described by referring to FIGS. 7 and 8.

FIG. 7 is an illustration for explaining primary parts of a magnetic disk device. FIG. 8 is a plan view of the magnetic disk device.

The head stack assembly 250 has a carriage 251 having multiple arms 252. On the multiple arms 252, the multiple head gimbal assemblies 220 are mounted in the perpendicular direction at certain intervals. A coil 253, part of a voice coil motor, is mounted on the opposite side of the arms 252 in the carriage 251. The head stack assembly 250 is incorporated into the magnetic disk device.

The magnetic disk device has multiple hard disks 262 mounted on a spindle motor 261. Two sliders 210 are disposed for each hard disk 262 in a manner of being opposed to each other by sandwiching the hard disk 262. The voice coil motor has permanent magnets 263 disposed in a manner of being opposed to each other by sandwiching the coil 253 of the head stack assembly 250.

The head stack assembly 250 and an actuator except for sliders 210 support as well as locate the slider 210 relative to the hard disk 262 corresponding to a positioning device of the present invention.

In the magnetic disk device according to the present embodiment, an actuator allows moving sliders 210 in the track traversing direction of the hard disk 262 in order to position sliders 210 relative to the hard disk 262. Thin film magnetic heads included in sliders 210 record information on the hard disk 262 by the recording head and reproduce (or read) information recorded in the hard disk 262 by the reproducing head.

The head gimbal assembly and the magnetic disk device according to the present embodiment are as effective as the thin film magnetic head according to the above-mentioned embodiment.

Exemplary Embodiment

The present invention discussed above is explained through a detailed exemplary embodiment.

(Experiment 1)

A thin film magnetic head with primary parts shown in FIG. 4 was produced. The insulating layer 2 made of $Al_2O_3$ was formed on the slider substrate that was configured with a ceramic material of ALTIC ($Al_2O_3$.TiC). The first shield layer 3 made of NiFe and the discharging electrode that was made of the same material as the first shield layer 3 were formed at the same time, as shown in FIG. 4, on the $Al_2O_3$ insulating layer 2.

A flat plate area S of the discharging electrode 91 opposed to the slider substrate 1 was 25 μm×25 μm. An area of the discharging electrode 91 exposed to the ABS was 25 μm×1 μm (corresponding to a thickness). A distance d between the discharging electrode 91 (lower plane) and the slider substrate 1 was 1 μm (d=1 μm). The distance d corresponded to a layer thickness of the $Al_2O_3$ insulating layer 2. Relative permittivity $\epsilon_r$ of $Al_2O_3$ that forms the insulating layer 2 was equal to 7 ($\epsilon_r$=7). Vacuum electric permittivity $\epsilon_0$ was equal to $8.85 \times 10^{-12}$ ($\epsilon_0 = 8.85 \times 10^{-12}$). Therefore, the capacitance C of the capacitor was as follows:

$$C = \epsilon_0 \times \epsilon_r \times (S/d) = 0.1 \text{ pF}.$$

The purpose of the experiment was to detect a medium projection of which the height was 5 nm when the flying height is 10 nm. The potential of the discharging electrode was set 0.7 V (0.7V=0.14 V/nm×5 nm, charge voltage).

When the discharging was started, the potential of the discharging electrode was temporarily dropped to 0 V. However, because electrical charge flowed in through the resistance R of the input line 93, the potential was recovered to 0.7 V again.

Figure 9:
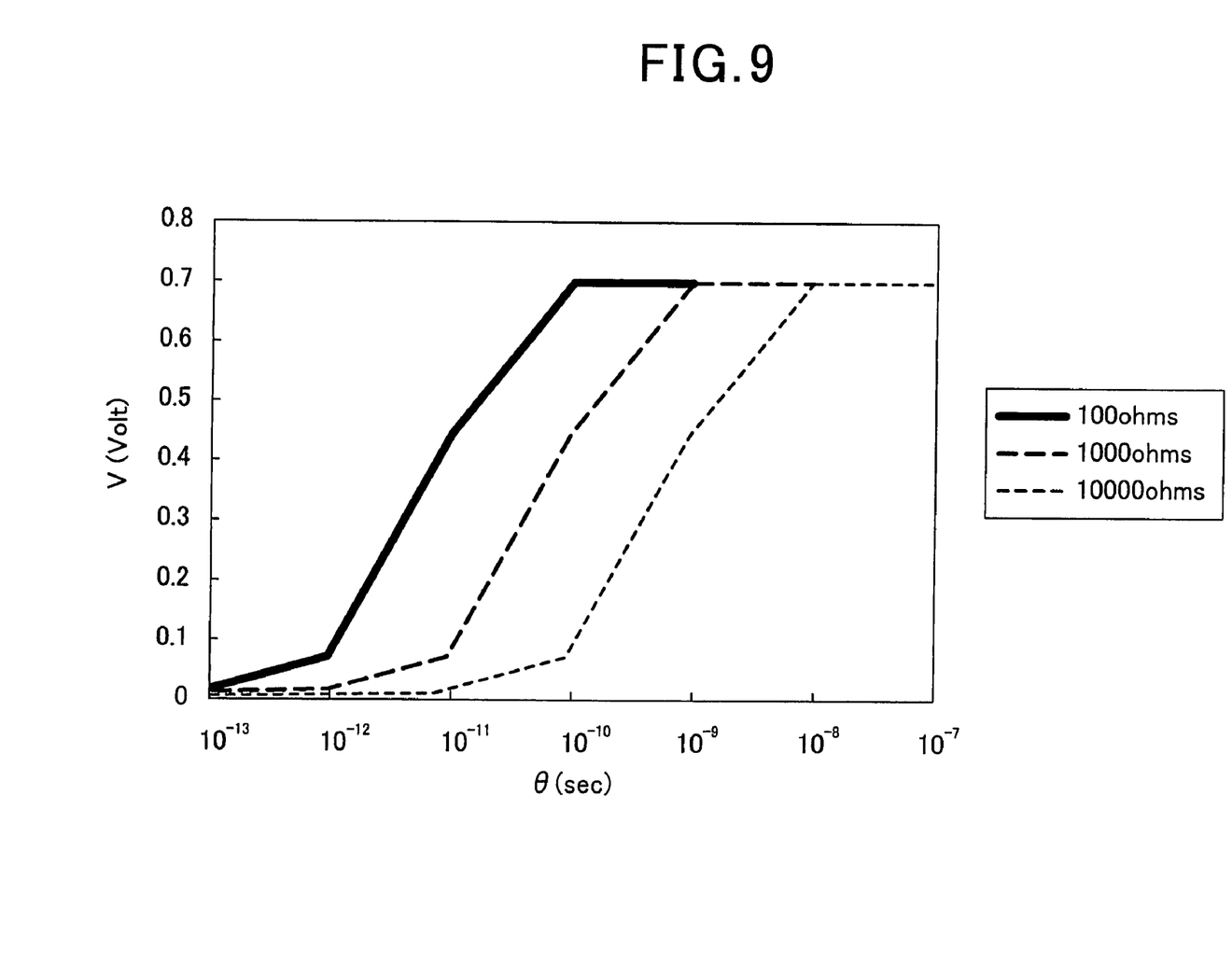
FIG. 9 is a graph for calculating a returning time to 0.7 V. Here, the X axis represents a elapsed time θ (sec) after discharging. The Y axis represents discharging electrode potential V (Volt). The parameter is resistance.

When the resistance R was changed to 100Ω, to 1,000Ω, or to 10,000Ω, a return time to 0.7 V was measured. As shown in FIG. 9, the X axis represents a lapse time θ (sec) after discharging. The Y axis represents discharging electrode potential V (Volt). As shown in the graph in FIG. 9, it was confirmed that the return time to 0.7 V was 0.1 nsec in the case of 100Ω, 1 nsec in the case of 1,000Ω, and 10 nsec in the case of 10,000Ω, respectively.

In the present experiment, the experiment for detecting a medium projection in which the height was 5 nm when the flying height is 10 nm was performed by using 1 kΩ, 10 kΩ, and 100 kΩ, as a resistance R. Discharging occurred between the discharging electrode and the projection that was a detection target so that voltage change of the electrode occurred. Projection location with a certain height in a medium was specified in a non-contacting manner by detecting the voltage change.

According to the experimental results above, an effect of the present invention is apparent.

The thin film magnetic head of the present invention includes a medium projection detection mechanism that detects a projection on a surface of a recording medium located opposed to an air bearing surface (ABS) of the thin film magnetic head. The medium projection detection mechanism has a discharging electrode in which a discharging edge is exposed in the vicinity of the reproducing element on the ABS, a capacitor that stores an electric charge by connecting to the discharging electrode, and an input line and an output line that are connected to the discharging electrode. The discharging electrode is configured to receive a voltage applied through the input line by a voltage application device that is connected from the outside, and the capacitor is configured to store electric charge by the applied voltage. The output line is connected to a projection detection processing system, the output line being connected to the charging electrode and the projection detection processing system to detect the location of the projection that is a detection target on the surface of the recording medium by detecting voltage change that is caused by discharging between the discharging electrode and the projection that is the detection target existing on the surface of the recording medium when the projection is detected. Therefore, the effect of enabling detection of a projection on a recording medium surface in a non-contacting manner instead of the conventional contact-based mapping for the projection on the recording medium surface is obtained.

Possibilities for the industrial use of the present invention include its use in a magnetic disk device with an MR element that detects magnetic field intensity as a signal from a magnetic recording medium, and so on.

What is claimed is:

1. A thin film magnetic head having a slider substrate and a reproducing element, comprising:
   a medium projection detection mechanism that detects a projection on a surface of a recording medium located opposed to an air bearing surface (ABS) of the thin film magnetic head, wherein
   the medium projection detection mechanism has a discharging electrode in which a discharging edge is exposed in a vicinity of the reproducing element on the ABS, a capacitor that stores an electric charge by connecting to the discharging electrode, and an input line and an output line that are connected to the discharging electrode,
   the discharging electrode is configured to receive a voltage applied through the input line by a voltage application device that is connected from the outside, and the capacitor is configured to store electric charge by the applied voltage, and
   the output line is connected to a projection detection processing system, the output line being connected to the discharging electrode and the projection detection processing system to detect in a non-contacting manner the location of the projection that is a detection target on the surface of the recording medium by discharging between the discharging electrode and the projection that is the detection target existing on the surface of the recording medium and by detecting voltage change that is caused by the discharging when the projection is detected.

2. The thin film magnetic head according to claim 1, wherein
   a resistance is inserted between the voltage application device that is connected to the outside and the discharging electrode in order to obtain a signal of the voltage change.

3. The thin film magnetic head according to claim 2, wherein
   the resistance is inserted in the input line.

4. The thin film magnetic head according to claim 1, wherein
   one end of the capacitor is connected to the discharging electrode and another end of the capacitor is grounded through the slider substrate.

5. The thin film magnetic head according to claim 1, wherein
   a length in a track width direction (X direction) of a discharging edge that is exposed on the ABS of the discharging electrode is 0.1-25 µm, and a length in a height direction (Z direction) of the discharging edge is 0.1-5 µm.

6. The thin film magnetic head according to claim 1, wherein
   electrical capacitance of the capacitor is 0.01-1 pF.

7. The thin film magnetic head according to claim 1, wherein
   voltage applied by the voltage application device is 0.01-1.0 V.

8. The thin film magnetic head according to claim 1, the thin film magnetic head further comprising:
   an insulating layer that is formed on the slider substrate,
   a first shield layer and a discharging electrode that are formed on the insulating layer, the discharging electrode and the first shield layer made of the same material, wherein
   parasitic capacitance of the insulating layer that is sandwiched between the discharging electrode and the slider substrate is used as capacitor capacitance.

9. A head gimbal assembly comprising:
   the thin film magnetic head according to claim 1; and
   a suspension elastically supporting the slider substrate.

10. A magnetic disk device comprising:
    the thin film magnetic head according to claim 1;
    a voltage application device connecting to a discharging electrode through the input line; and
    a projection detection processing system in which, when a projection that is a detection target existing on the surface of the recording medium is detected through the output line, the projection detection processing system detects the location of the projection that is a detection target on the surface of the recording medium by detecting voltage change that is caused by discharging between the discharging electrode and the projection that is the detection target.

11. The magnetic disk device according to claim 10, the projection detection processing system further comprising:
    an amplifier that amplifies the voltage change of the discharging electrode at a time when the discharging occurs, and
    a comparator that is configured to generate a digital pulse in correspondence with a threshold that is previously set.

* * * * *